Dec. 15, 1964 G. M. TURNER 3,161,710
POLYMERIZATION PROCESS FOR POLYESTER FILMS
Filed July 27, 1961
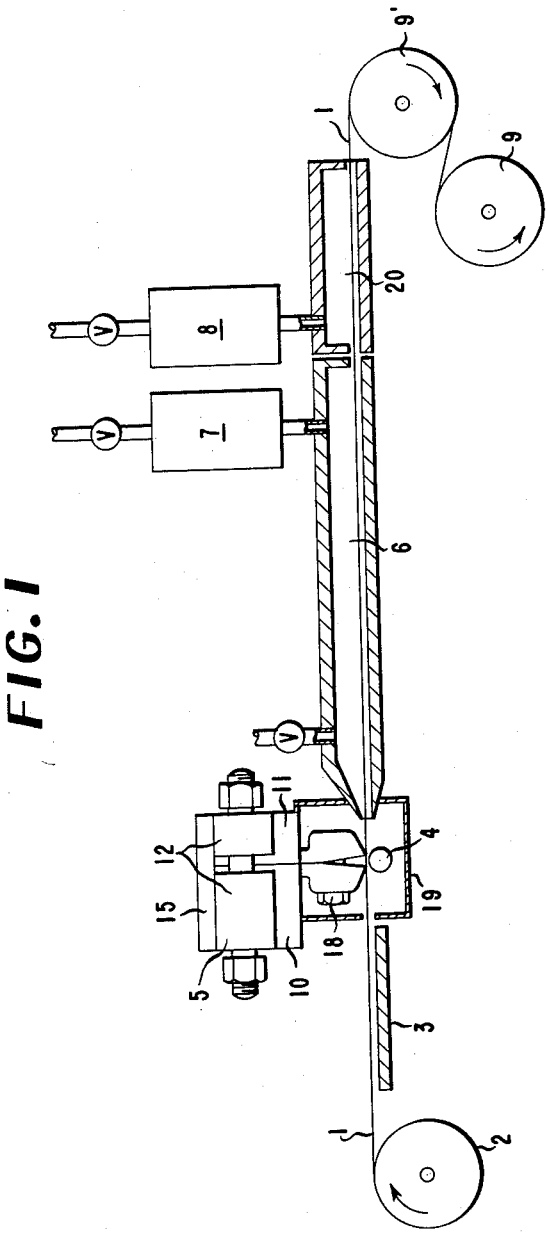
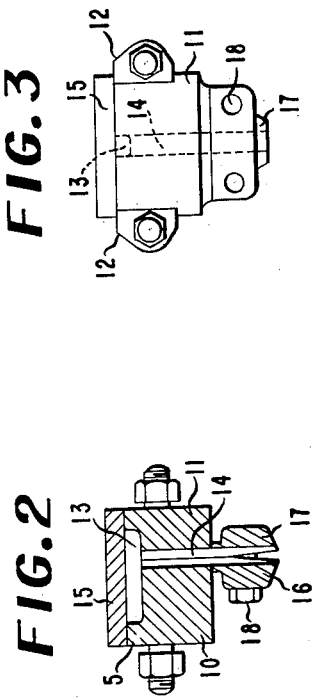
INVENTOR
GILBERT M. TURNER
BY Frank C. Hilberg
ATTORNEY United States Patent Office 3,161,710
Patented Dec. 15, 1964

3,161,710
POLYMERIZATION PROCESS FOR
POLYESTER FILMS
Gilbert M. Turner, Wilmington, Del., assignor to E. I.
du Pont de Nemours and Company, Wilmington, Del.,
a corporation of Delaware
Filed July 27, 1961, Ser. No. 127,402
15 Claims. (Cl. 264—216)

This invention relates to a process for preparing linear condensation polyesters, especially the linear terephthalate polyesters. More particularly, it relates to a process for the rapid preparation of linear condensation polyesters of high quality. This application is a continuation-in-part of my copending application Ser. No. 845,160, filed October 8, 1959, and now abandoned.

Synthetic linear condensation polyesters, such as polyethylene terephthalate and its copolyesters, have attracted high commercial interest for fibers and many other uses owing to their high tenacity, flexibility, crease resistance, low moisture absorption, and other valuable properties. The conventional method for preparing polyethylene terephthalate involves heating bis-2-hydroxyethyl terephthalate or a polymeric condensate thereof having a low degree of polymerization in the presence of a catalyst under reduced pressure. The reaction is frequently carried out in a tube on the laboratory scale; while on the commercial scale autoclaves have been employed, and the use of a continuous polymerization vessel or series of vessels has also been described. The reaction proceeds by means of polycondensation with evolution of free glycol. Accordingly, in order to decrease the time required for the reaction, means for rapidly regenerating surface area in the reaction mixture are usually employed. For example, the use of a stirrer or agitator equipped with blades, screens, plates, or the like rotating into and out of the surface of the reaction mixture has been described. However, in spite of the use of means for surface regeneration, the reaction generally requires several hours for completion when carried out by prior art methods. Similarly long reaction times have also been considered necessary for the preparation of other linear terphthalate polyesters, such as poly(p-hexahydroxylylene terephthalate).

Various attempts have been made to reduce the time required for preparation of the linear condensation polyesters. For instance, attention has been focused on experience gained in preparing the linear condensation polyamides, which are frequently considered to be analogous to the linear condensation polyesters. In the case of the polyamides, it has been found previously that when the reaction mixture is maintained in the form of a film only 25 mils thick, the time required to reach an intrinsic viscosity of 1.3 (corresponding to the molecular weight of polyamides used for spinning commercial textile fibers) is only about 10–12 minutes, as contrasted with several hours when the polyamide is prepared in an autoclave at the same temperature and pressure. Rather surprisingly, however, it has been found that similar results are not obtained when this technique is applied in the preparation of the linear condensation polyesters. Instead, it has been found that several hours are required for polycondensation of 25-mil films of bis-2-hydroxyethyl terephthalate to an intrinsic viscosity of 0.6 (corresponding to the molecular weight of polyesters used for spinning commercial textile fibers), or approximately the same time required to reach the same viscosity level in an autoclave at the same temperature and pressure.

It is therefore an object of the present invention to provide a rapid process for preparing linear condensation polyesters, especially linear terephthalate polyesters such as polyethylene terephthalate and its copolyesters. Another object is to provide a rapid process for producing said polyesters at a high level of quality. A further object is to provide a process adaptable for polymerizing said polyesters to a very high molecular weight. Other objects will appear as the description of the invention proceeds.

In accordance with the present invention a reaction mixture comprising bifunctional ester-forming reactants, polymerizable with evolution of a volatile byproduct and containing a catalyst for the polymerization thereof, is passed in the form of a film having a thickness in the range 0.01 to 1 mil through a zone maintained at a tempertaure of at least 260° C. for a time in the range of about 2 seconds to about 2 minutes while the partial pressure of the volatile by-product in the atmosphere of the zone is maintained less than about 2 mm. of mercury. The product is a linear condensation polyester having an intrinsic viscosity of from about 0.5–0.6 to about 2 or even higher. In a preferred embodiment of the invention, the bifunctional ester-forming reactant is a glycol dicarboxylate comprising at least about 75% of a glycol terephthalate, or a polymer thereof having a low degree of polymerization; and the product is a linear terephthalate polyester of high moleculer weight. Surprisingly, the polymer produced in this manner is also of very high quality, as measured by its exceptionally low content of carboxyl end groups, low content of diethylene glycol and other ether-containing groups, and low color. High values for these parameters are indicative of degradative side reactions and are regarded as deleterious to the yarn.

The invention will be better understood by reference to the accompanying drawings, in which FIGURE 1 is a schematic plan view partly in section illustrating apparatus suitable for carrying out the polymerization reaction and FIGURE 2 is a cross sectional view of the feeder for supplying a thin film of the starting material and FIGURE 3 is a side view of FIGURE 2.

As shown in FIGURE 1, the polycondensation reaction is suitably carried out on a metallic tape 1 of any convenient width drawn from a feed roll 2. The tape is passed over a heating plate 3 and then between roll 4 and feeder 5, which continuously deposits on the tape a film of the desired thickness of the liquid monomeric or low polymer starting material liquid on the tape. The tape then passes immediately into oven 6, seen in cross section in FIGURE 1, the walls of which are heated by suitable heating elements not shown. A stream of nitrogen gas or other inert gas is heated to the desired temperature in gas preheater 7 and passed through the oven in the direction opposite to the direction of the moving tape. The reaction takes place as the tape passes through the oven and ceases as the tape passes from the oven into the quenching chamber 20, which is cooled by cooling coils not shown surrounding the chamber. A stream of nitrogen gas or other inert gas cooled to a very low temperature, preferably about —50° C. or lower, is passed from supply vessel 8 through the quenching chamber in the direction of movement of the tape. The tape bearing the polymerized film is then wound up around roll 9' and on roll 9. The linear condensation polyester product is subsequently readily removed from the tape, which may be made of aluminum, steel, or other suitable metal.

The body of the feeder 5 as shown in FIGURE 2 consists essentially of two members 10 and 11 bolted together through wings 12 mounted on the sides of each member. As shown in FIGURE 2, the members together form a supply chamber 13 for liquid starting material and a vertical channel 14 through which it flows down onto the moving tape. The feeder is heated by any suitable means not shown and is also provided with a top 15. The channel 14 is defined by aligned grooves in members 10 and 11 which are usually semicircular in cross section in the upper part of the members; however, a thin wedge (exaggerated in the figures) of the inner surface of each member is removed in the delivery sections 16 and 17 at the lower portion of each member. The delivery sections 16 and 17 are held in place by a cap screw 18, the adjustment of which readily permits control of the size of the channel orifice and thereby permits precise control of the rate of flow of starting material liquid onto the moving tape. An enclosure 19 surrounds the delivery section of the feeder to permit surrounding of the starting material liquid film by an inert gas filling the enclosure and maintained under slight positive pressure.

Methods suitable for removing the polymeric film from the metallic tape include doctoring the molten polymer from the tape, peeling or scraping the solidified film from the tape, swelling the polymer with methylene chloride and then scraping it off, or dissolving the metallic tape with a reagent which will not degrade the polymer. In the case of aluminum tape, 0.001 N mercuric chloride solution is a suitable reagent for this purpose. For some industrial applications, however, removal of the polymer from the tape is not necessary. For instance, metallic tapes coated with insulating films of polyethylene terephthalate having a thickness on the order of about 0.01–0.1 mil for use in capacitors and other electrical applications can be made directly in accordance with the process of the invention.

In accordance with the invention, the starting material for the reaction comprises a bifunctional ester-forming reactant, polymerizable with evolution of a volatile by-product. In other words, the bifunctional compound is adapted for undergoing a condensation reaction to form long, linear molecules with periodically spaced divalent ester radicals in the chain, each of said ester radicals comprising a carbonyl group attached on at least one side to an oxygen atom. The bifunctional ester-forming reactant may already be a condensate having a low degree of polymerization; or it may be a monomeric compound. Each bifunctional ester-forming reactant, whether monomeric or a condensate of low molecular weight, should however preferably comprise at least one of the repeating structural units of the ultimate polyester to be formed together with the elements of one volatile by-product molecule.

By "volatile by-product" is meant an organic or inorganic compound, usually of low molecular weight, which is readily distilled out or otherwise removed from the reaction mixture under polycondensation conditions, usually 250–400° C. under vacuum or with a flow of nitrogen gas at about the same temperature as the reaction mixture. Typical examples of volatile by-products are glycol, acetic acid, and phenol.

The linear condensation polyester produced by the polycondensation reaction is made up of repeating structural units comprising a series of predominantly carbon atom chains joined by recurring divalent ester radicals. The said predominantly carbon atom chains, derived from the bifunctional ester-forming reactant, may be, e.g., hydrocarbon radicals, halogen-substituted hydrocarbon radicals, and chalkogen-containing hydrocarbon radicals wherein each chalkogen atom is bonded to carbon or a different chalkogen atom, and no carbon is bonded to more than one chalkogen atom. Thus, the repeating units may contain ether, sulfonyl, sulfide, or carbonyl radicals. Various other substituents such as sulfonate salts, sulfonamides, etc. may be present.

More than one type of bifunctional ester-forming reactant may be present. As used herein, the term "polyester" is therefore intended to comprehend copolyesters, terpolyesters, and the like.

The bifunctional ester-forming reactant may be an ester of a hydroxy acid with a volatile acid or a volatile glycol or alcohol; for example, the bifunctional ester-forming reactant may be 4-(2-acetoxyethyl)benzoic acid or 2-hydroxyethyl 4-(2-hydroxyethoxy)benzoate. More usually, a suitable dihydroxy compound or derivative thereof is mixed with a suitable dicarboxylic acid or derivative thereof. If either the dihydroxy compound or the dicarboxylic acid is sufficiently volatile, the volatile compound is usually used in excess and during the course of the polycondensation reaction the reaction mixture adjusts itself ever more closely to equimolar quantities of the two reactants. If neither the dihydroxy compound nor the dicarboxylic acid is sufficiently volatile, an ester of the dihydroxy compound with a volatile acid is used or, alternately, an ester of the dicarboxylic acid with a volatile hydroxy compound is employed.

Typical dicarboxylic acids which may be employed are terephthalic acid, isophthalic acid, 4,4'-dicarboxydiphenyl ether, 4,4'-diphenic acid, 4,4'-sulfonyldibenzoic acid, 4,4'-benzophenonedicarboxylic acid, 1,2 - bis(4 - carboxyphenoxy)ethane, hexahydroterephthalic acid, bromoterephthalic acid, 5-chloroisophthalic acid, and various of the naphthalene-dicarboxylic acids, especially the 1,4-, 1,5-, 2,6-, and 2,7-isomers. Of course, it is frequently desirable to use the dicarboxylic acids in the form of their dimethyl esters or other suitable derivatives.

The dihydroxy compound may be either a bisphenol or a glycol. Typical bisphenols which are suitable (especially in the form of their diacetates or diesters of other volatile acids) include hydroquinone, resorcinol, bis(4-hydroxyphenyl)methane, 1,1 - bis - (4 - hydroxyphenyl) ethane, 2,2-bis(4-hydroxyphenyl) propane (more conveniently known as diphenylolpropane), 2,2-bis(3,5-dichloro - 4 - hydroxyphenyl)propane, 4,4'-dihydroxybenzophenone, bis-(4-hydroxyphenyl)sulfone, and 1,2-bis-(4-hydroxyphenyl)ethane. Typical glycols which may be employed as the dihydroxy compound include ethylene glycol, trimethylene glycol, pentamethylene glycol, and cis- or trans- p-hexahydroxylylene glycol, as well as other glycols listed hereinbelow.

In the preferred embodiment of the invention, the starting material for the reaction is a material selected from the class consisting of glycol esters of dicarboxylic acids, wherein at least about 75% of the dicarboxylic acid content is terephthalic acid, and low molecular weight condensation polymers thereof. The starting material may be represented in a general way by the formula

HO—G(OOC—A—COO—G)$_x$—OH wherein —G— and —A— are divalent organic radicals corresponding, respectively, to the radicals in the initial glycol, G(OH)$_2$, and in the initial dicarboxylic acid, A(COOH)$_2$, and $x$ is a number in the range of 1 to about 20; at least about 75% of the —OOC—A—COO— radicals being terephthalate radicals. The terephthalate radical may be the sole dicarboxylate constituent of the recurring structural units, or up to about 25% of the recurring structural units may contain other dicarboxylic radicals, such as the adipate, sebacate, 2,6- or 2,7-naphthalenedicarboxylate, isophthalate, 5 - (sodium sulfo)-isophthalate, bibenzoate, hexahydroterephthalate, diphenoxyethane-4,4'-dicarboxylate, or p,p'-sulfonylbibenzoate radicals, derived from the corresponding dicarboxylic acids or ester-forming derivatives thereof.

The glycol, G(OH)$_2$, from which the polyester is prepared may be any suitable dihydroxy compound containing from 2 to 18 carbon atoms, preferably from 2 to 10 carbon atoms, in which the hydroxyl groups are attached to saturated carbon atoms. Preferably, at least about 75% of the glycol is an aliphatic or cycloaliphatic glycol. In the preferred glycols the radical —G— may be represented by the formula

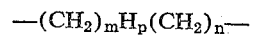

—(CH$_2$)$_m$H$_p$(CH$_2$)$_n$— wherein $m$ and $n$ are integers in the range 1 to 6, H represents a cyclohexane nucleus, and $p$ is 0 or 1. Examples of suitable glycols include ethylene glycol, tetramethylene glycol, hexamethylene glycol, decamethylene glycol, cis- or trans-p-hexahydroxylylene glycol, and cis- or trans-bis-1,4-(hydroxyethyl)cyclohexane. Mixtures of the glycols may be used. The aliphatic or cycloaliphatic glycol may be the sole glycol constituent of the recurring structural units, or up to about 25% of the recurring structural units may contain other glycol radicals, such as bis-p-(2-hydroxyethyl)-benzene or 4,4-bis-(2-hydroxyethyl)biphenyl. Up to about 25 mol percent of diethylene glycol, triethylene glycol, bis-(4-hydroxybutyl) ether, or up to about 15 weight percent of a higher glycol such as polyethylene glycol of high molecular weight may be added if desired; however, such ether-containing glycols are avoided when it is desired to minimize ether groups in the product. The presence of ether groups in the linear condensation polyester is generally deleterious to the dye lightfastness of the polymer; however, for certain specialized end uses, the presence of significant proportions of ether groups may sometimes be desired.

The product obtained from the preferred glycol dicarboxylate starting material is a linear terephthalate polyester. By "linear terephthalate polyester" is meant a glycol dicarboxylate condensation polyester of the formula $$HO-G(OOC-A-COO-G)_y-OH$$

wherein —G— and —A— are as previously defined and $y$ is at least 70; at least about 75% of the —OOC—A—COO— radicals being terephthalate radicals. In the case of polyethylene terephthalate, the value of $y=70$ is equivalent to an intrinsic viscosity of 0.6, corresponding to a molecular weight suitable for spinning commercial textile fibers. However, in accordance with the process of the invention, intrinsic values of 2.5 and even higher, corresponding to a value of $y=1000$ and above, are readily achieved. Polyester fibers of such high molecular weight have unusually high tenacity and other valuable physical properties.

Any of the various well-known catalysts for the polymerization of bifunctional ester-forming reactants may be used to promote the rate of reaction. Among such catalysts are glycol-soluble compounds of antimony, especially antimony trioxide; titanate esters, such as tetraisopropyl titanate; litharge (PbO); anhydrous sodium acetate and zinc acetate and other glycol-soluble compounds of zinc. When the film is supported on stainless steel during the polycondensation reaction, the stainless steel support itself exhibits a marked catalytic effect. Auxiliary catalysts such as catalysts used in an ester interchange reaction in preparing the bifunctional ester-forming starting material may be present. Such catalysts include glycol-soluble compounds of manganese, lanthanum, and calcium. Color inhibitors, such as phosphoric acid and the phosphate esters, may also be present.

In accordance with the invention, a film thickness in the range 0.01–1 mil must be maintained during the reaction. When film thicknesses greater than 1 mil are used, the rate of reaction drops off very sharply as the film thickness is progressively increased. Below 0.01 mil, no additional increase in the rate of reaction is observed, and the process becomes inefficient owing to the low volume of material handled per unit area of reaction surface, with no corresponding benefit of increased reaction rate.

Increasing reaction rates are observed as the temperature is increased. Temperatures below about 260° C. are too low to provide a suitable rate of reaction. On the other hand, temperatures of 400° C. or even 440° C. or higher may be used without excessive degradation of the product, since the reaction may be completed within a few seconds at such high temperatures.

Another factor which plays an important part during the polymerization reaction is the partial pressure of the volatile by-product. In accordance with the invention, it has been found that the volatile by-product partial pressure should be maintained below about 2 mm. of mercury, preferably below 0.1 mm. of mercury. This is readily achieved by sweeping over the film a stream of inert gas, such as nitrogen. By determining the amount of volatile by-product in the effluent gas at various rates, the rate required to maintain the partial pressure at the desired level can be determined readily. Rates of gas flow high enough to cause rippling of the film surface are not usually required, and are generally to be avoided.

The following examples will serve to illustrate further the nature of the invention, although they are not to be construed as limitative.

The intrinsic viscosity of the polymer is determined in accordance with the relationship $$\text{limit } \frac{\ln \eta_r}{C} \text{ as C approaches 0}$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 42.2 parts by weight of trichlorophenol, is a convenient solvent for measuring the intrinsic viscosity of linear polyesters, and intrinsic viscosity values reported herein are with reference to Fomal as a solvent except where otherwise indicated. Another convenient solvent is trifluoroacetic acid/methylene chloride (75%/25%).

EXAMPLE 1

Bis-2-hydroxyethyl terephthalate (256 parts) containing 0.035 mol percent manganous acetate (0.061 part) and 0.031 mol percent antimony trioxide (0.090 part) is used as the feed material in each of a series of runs in the apparatus shown in the figures. The results are reported in Table I. Listed in the table are the temperatures maintained during the reaction; the reaction time (length of time reaction mixture remains in oven); film thickness of the reaction mixture as calculated from the rate of feed of starting material, width of the film, and tape speed; instrinsic viscosity of the product; and the type of metallic tape employed to support the reacting film. The sweep of nitrogen gas is adjusted to provide a glycol partial pressure of 0.1 mm. of mercury or lower in each instance.

*Table I*

POLYCONDENSATION OF BIS-2-HYDROXYETHYL TEREPHTHALATE

|   | Tape material | Film Thickness, Mils | Temperature, °C. | Time, Seconds | Intrinsic Viscosity |
|---|---|---|---|---|---|
| 1 | Stainless Steel | 0.1 | 275 | 12 | 0.70 |
| 2 | do | 0.1 | 275 | 15 | 1.19 |
| 3 | do | 0.3 | 275 | 40 | 0.70 |
| 4 | do | 0.5 | 275 | 71 | 0.87 |
| 5 | do | 0.5 | 275 | 118 | 1.31 |
| 6 | do | 0.1 | 300 | 8.7 | 0.69 |
| 7 | Aluminum | 0.2 | 260 | 120 | 1.88 |
| 8 | do | 0.1 | 275 | 60 | 1.28 |
| 9 | do | 0.2 | 275 | 120 | 2.20 |
| 10 | do | 0.3 | 300 | 29 | 0.78 |
| 11 | do | 0.1 | 300 | 30 | 1.83 |
| 12 | do | 0.1 | 346 | 4 | 0.60 |
| 13 | do | 0.1 | 346 | 10 | 1.07 |
| 14 | do | 0.1 | 346 | 16 | 1.53 |

EXAMPLE 2

A mixture of 256 parts of bis-2-hydroxyethyl terephthalate, 7.1 parts of bis-2-hydroxyethyl 5-(sodium sulfo)-isophthalate (2 mol percent, based on the terephthalate ester), and a mixture of catalysts comprising 0.021 part of manganous acetate, 0.052 part of antimony trioxide, 0.17 part of sodium acetate, and 0.06 part of phosphoric acid is used as the feed material in an experimental run in the apparatus shown in the figures. A film having a thickness of 0.3 mil is continuously laid on a moving aluminum tape and the reaction is carried out at 275° C. for an exposure time of 115 seconds in the oven. The sweep of nitrogen gas is adjusted to provide glycol partial pressure below 0.1 mm. of mercury. The product, polyethylene terephthalate/5 - (sodium sulfo) isophthalate (98/2), has an intrinsic viscosity of 0.64.

Similar results are obtained when a mixture of 217.6 parts of bis-2-hydroxyethyl terephthalate (0.85 mol) and 38.4 parts of bis-2-hydroxyethyl isophthalate (0.15 mol) is used as starting material with a catalyst comprising 0.061 part of manganous acetate and 0.090 part of antimony trioxide.

EXAMPLE 3

Pure bis-2-hydroxyethyl terephthalate is used as the feed material in two experimental runs in the apparatus shown in the figures. A film having a thickness of 0.1 mil is continuously laid on a moving stainless steel tape and the reaction is carried out at 275° C. for oven exposure times of 48 seconds and 120 seconds, respectively. The sweep of nitrogen gas is adjusted to provide a glycol partial pressure below 0.1 mm. of mercury in each instance. The polyethylene terephthalate products from the two runs are found to have intrinsic viscosities of 0.83 and 2.43, respectively.

Similar results are obtained when an ester derived from two mols of p-hexahydroxylyene glycol (70% trans isomer, 30% cis isomer) and one mol of terephthalic acid is used as a starting material to prepare poly(p-hexahydroxylylene terephthalate) of high intrinsic viscosity. As in the runs described in the preceding paragraph, no catalyst is employed other than the stainless steel tape used to support the reacting film.

EXAMPLE 4

Bis-2-hydroxyethyl terephthalate containing 115 parts per million of zinc acetate as a catalyst is used as the feed material in an experimental runs in the apparatus shown in the figures. A film having a thickness of 0.2 mil is continuously laid on a moving aluminum tape and the reaction is carried out at 275° C. for an oven exposure time of 109 seconds. The sweep of nitrogen gas is adjusted to provide a glycol partial pressure below 0.1 mm. of mercury. The polyethylene terephthalate product is found to have an intrinsic viscosity of 0.68.

In a similar experiment, the starting material is 256 parts of bis-2-hydroxyethyl terephthlate containing 0.056 part of tetraisopropyl titanate as a catalyst. The tape is aluminum, the temperature 275° C., the film thickness 0.1 ml, and the reaction time 30 seconds. The polyethylene terephthalate product is found to have an intrinsic viscosity of 1.18.

In still another experiment, the starting material is 256 parts of bis-2-hydroxyethyl terephthalate containing 0.079 part of antimony trioxide as a catalyst. The tape is aluminum, the temperature 260° C., the film thickness 0.04 mil, and the reaction time 115 seconds. The polyethylene terephthalate product is found to have an intrinsic viscosity of 1.3.

EXAMPLE 5

A polymeric condensate of bis-2-hydroxyethyl terephthalate (210 parts) having an intrinsic viscosity of 0.135, corresponding to a degree of polymerization of about 4, and containing 0.061 part of manganous acetate and 0.084 part of antimony trioxide is used as the feed material in an experimental run in the apparatus shown in the figures. A film having a thickness of 1.0 ml is continuously laid down on a moving aluminum tape and the reaction is carried out at 275° C. for an exposure time of 110 seconds in the oven. The sweep of nitrogen gas is adjusted to provide a glycol partial pressure below 0.1 mm. of mercury. The polyethylene terephthalate product is found to have an intrinsic viscosity of 0.6.

In a similar experiment, the starting material is 196 parts of a polymeric condensate of bis-2-hydroxyethyl terephthalate having an intrinsic viscosity of 0.245, corresponding to a degree of polymerization of 15, containing 0.061 part of manganous acetate and 0.084 part of antimony trioxide. The tape is aluminum, the temperature 275° C., the film thickness 0.1 mil, and the reaction time 49 seconds. The polyethylene terephthalate product is found to have an intrinsic viscosity of 0.6.

EXAMPLE 6

Bis-2-hydroxyethyl terephthalate (256 parts) containing 0.061 part of manganous acetate and 0.090 part of antimony trioxide as catalyst is analyzed and found to contain 1.0% diethylene glycol and 6.1 equivalents of free carboxyl per million grams. The color is observed to be 2.8 units. The mixture is used as the feed material in an experimental run in the apparatus shown in the figures. The tape is aluminum, the temperature 300° C., the film thickness 0.5 mil, and the reaction time 38 seconds. The glycol partial pressure is maintained below 0.1 mm. of mercury. The polyethylene terephthalate product is found to have an intrinsic viscosity of 0.6, a diethylene glycol content of 1.0% (same as starting material), and a carboxyl content of 14.1 equivalents of free carboxyl per million grams of polymer. The color is observed to be 5.9 units.

By comparison, polyethylene terephthalate prepared from the same starting material in a large-scale vessel in the conventional manner for commercial use and having an intrinsic viscosity of 0.6 is found to have a diethylene glycol content of 2.1%, a carboxyl content of 28 equivalents of free carboxyl per million grams of polymer, and a color of 11 units.

In the example above, the concentration of carboxylic acid groups is determined by dissolving a weighed sample of the polymer in a hot mixture of benzyl alcohol and chloroform, cooling the solution, and titrating with standard caustic solution. Color units are the percentage absorbance readings of a 10% solution of the polymer in Fomal as observed in a standard colorimeter at 400 m$\mu$ (1 cm. cell). The diethylene glycol content of the polymer is determined by hydrolyzing the polymer in 20% caustic solution; removing the terephthalic acid and other acids by passing the resulting solution through an ion exchange column; oxidizing the resulting glycol solution to convert the ethylene glycol to acetaldehyde; converting the aldehyde to a Schiff's base and removing the base by passing the solution through an ion exchange column; oxidizing the resulting solution with sodium dichromate and determining the amount of dichromate required for the oxidation; and calculating the amount of diethylene glycol on the basis that all the oxidizable material is diethylene glycol.

EXAMPLE 7

Diphenylolpropane diacetate (62.47 parts) is heated with isophthalic acid (33.23 parts) in the presence of anhydrous sodium acetate (0.164 part), beginning at 245° C. with a constant stream of nitrogen bubbled slowly through the mixture. Acetic acid is distilled out and collected. After 14.4 parts of acetic acid (60% of theory) have been removed, the reaction is stopped and the prepolymer product is cooled and ground up. The intrinsic viscosity, as measured in trifluoroacetic acid/methylene chloride solvent, is 0.01. The prepolymer is used as the feed material in each of a series of runs in the apparatus shown in the figures. The results are reported in Table II. The reaction in each case is carried out on aluminum tape at a temperature of approximately 351° C. The reaction time (length of time reaction mixture remains in oven) and film thickness of the reaction mixture are listed in the table for each run. The partial pressure of the acetic acid over the reaction mixture is maintained less than 0.1 mm. of mercury in each instance through a sweep of nitrogen gas through the oven. Intrinsic viscosity values (trifluoroacetic acid/methylene chloride solvent) for the product, films of poly(isopropylidene-4,4'-diphenylene isophthalate), are reported in the table. The films so produced are tough, colorless, flexible, and amorphous.

Table II
POLYCONDENSATION OF DIPHENYLOLPROPANE DIACETATE ON ALUMINUM TAPE AT 351° C.

| | Film Thickness, Mils | Oven Exposure Time, Seconds | Intrinsic Viscosity of Product |
|---|---|---|---|
| 1 | 0.1 | 29.5 | 1.45 |
| 2 | 0.2 | 29.5 | 0.94 |
| 3 | 0.4 | 29.5 | 0.61 |
| 4 | 0.6 | 29.5 | 0.40 |
| 5 | 0.6 | 49.6 | 1.34 |
| 6 | 0.8 | 49.6 | 0.61 |

EXAMPLE 8

Diphenylolpropane (102.7 parts) is heated with diphenyl isophthalate (143.2 parts) in the presence of antimony trioxide (0.06 parts) with evolution of phenol. After removal of 42.3 parts of phenol (50% of theoretical reaction), the reaction is stopped and the prepolymer is cooled and ground up. Its intrinsic viscosity, measured in trifluoroacetic acid/methylene chloride solvent, is 0.06. A polycondensation reaction is then carried out by melting the prepolymer supply and continuously coating it on a moving stainless steel tape at such a rate as to provide a film 0.5 mil in thickness. The oven temperature is 350° C. and the exposure time in the oven is 62 seconds, a continuous sweep of nitrogen gas being provided at a rate sufficient to maintain the phenol partial pressure below 0.1 mm. of mercury. The product, poly-isopropylidene-4,4'-diphenylene isophthalate), has an intrinsic viscosity of 0.57 in trifluoroacetic acid/methylene chloride solvent.

EXAMPLE 9

2,2-bis(3,5-dichloro-4-hydroxyphenyl)propane diacetate (112.5 parts) is heated with 4,4'-dicarboxydiphenyl ether (65.8 parts) in the presence of anhyrous sodium acetate (0.10 part). Heat is applied and a constant stream of nitrogen is bubbled slowly through the mixture, whereupon the evolution of acetic acid is observed. After removal of 17 parts of acetic acid (60% of theory), the reaction is stopped and the prepolymer product is cooled and ground up. The intrinsic viscosity, as measured in trifluoroacetic acid/methylene chloride solvent, is 0.08. A film having a thickness of 0.3 mil is continuously laid on a moving aluminum tape and the material is polymerized at 350° C. for an exposure time of 80 seconds in the oven. The acetic acid partial pressure is maintained below 0.1 mm. of mercury with a stream of nitrogen gas. The product, poly(isopropylidene-3,3',5,5'-tetrachloro-4,4'-diphenylene 4'',4'''-diphenyletherdicarboxylate), is a tough, flexible, amorphous film of good color. The film is of quite high molecular weight, as indicated by its insolubility in typical solvents such as Fomal and trifluoroacetic acid/methylene chloride. Owing to the insolubility of the polymer, an intrinsic viscosity value cannot be obtained.

EXAMPLE 10

Hydroquinone diacetate (19.4 parts) is mixed with hexahydroterephthalic acid (16.6 parts) and anhydrous sodium acetate (0.05 part) and heated with evolution of acetic acid. A stream of nitrogen is bubbled slowly through the mixture to stir it. The reaction is stopped at 60% completion and the prepolymer is allowed to solidify, after which it is ground up. The intrinsic viscosity, as measured in trifluoroacetic acid/methylene chloride solvent, is less than 0.1. A film having a thickness of 0.2 mil is continuously laid on a moving aluminum tape and the reaction is carried out at 340° C. for an exposure time of 90 seconds in the oven, using a sweep of nitrogen gas to maintain the acetic acid partial pressure below 0.1 mm. of mercury. The product, poly(1,4-phenylene hexahydroterephthalate), is a tough white, opaque, crystalline film which is insoluble in Fomal, trifluoroacetic acid/methylene chloride, and other typical solvents.

EXAMPLE 11

A mixture of diphenylolpropane diacetate (22.8 parts), 5-chloroisophthalic acid (20.1 parts), and anhydrous sodium acetate (0.04 part) is heated, with constant mixing being accomplished by a stream of nitrogen gas. Acetic acid is evolved and, after 7 parts are collected, the reaction mixture is allowed to solidify and is ground up. Using the apparatus of the figures, an 0.2 mil film of molten prepolymer is continuously laid on a moving aluminum tape and a polymerization reaction is carried out at 350° C. for an exposure time of 96 seconds in the oven. A sweep of nitrogen gas through the oven is maintained to keep the acetic acid partial pressure below 0.1 mm. of mercury. The product, a colorless, tough, amorphous film, is poly(isopropylidene-4,4'-diphenylene 5-chloroisophthalate). It dissolves in trifluoroacetic acid/methylene chloride solvent and is found to have an intrinsic viscosity of 0.50.

EXAMPLE 12

A mixture of resorcinol diacetate (48.5 parts), isophthalic acid (41.5 parts), and anhydrous sodium acetate (0.10 part) is blanketed with nitrogen saturated with acetic anhydride at 25° C. The mixture is then heated, with evolution of acetic acid, and is stopped after 17 parts of acetic acid have been collected. After it solidifies, it is ground up. The intrinsic viscosity of the prepolymer in trifluoroacetic acid/methylene chloride is less than 0.1. Using the apparatus of the figures, an 0.2 mil coating of molten prepolymer is continuously laid on a moving aluminum tape and a polymerization reaction is carried out at 330° C. for an exposure time of 45 seconds in the oven. A sweep of nitrogen gas through the oven is maintained to keep the acetic acid partial pressure below 0.1 mm. of mercury. The product, poly(1,3-phenylene isophthalate), is a tough, clear, amorphous film which is insoluble in Fomal, trifluoroacetic acid/methylene chloride and other typical solvents.

It will be apparent that many widely different embodiments of this invention may be made without departing from the spirit and scope thereof, and therefore it is not intended to be limited except as indicated in the appended claims.

I claim:

1. In the condensation reaction of bifunctional ester-forming material in the presence of condensation catalyst with evolution of volatile by-product to form linear polyesters, the process of polymerizing material containing at least 75% of a glycol terephthalate which comprises forming the said material into a film having a thickness between about 0.1 and 1 mil while at least a substantial part of said reaction evolving volatile by-product remains for completion and then polymerizing the glycol terephthalate by heating the said film to a temperature of at least 260° C. for a period of time between about 2 seconds and 2 minutes until a polyester having an intrinsic viscosity between about 0.6 and about 2.5 is obtained, and during the heating maintaining the partial pressure of the glycol released from the said material at less than about 2 mm. of mercury.

2. The process of claim 1 in which the glycol terephthalate has an intrinsic viscosity substantially less than 0.6.

3. The process of claim 1 in which a film of the said material is deposited on a moving tape.

4. The process of claim 1 in which the glycol terephthalate has the formula $$HO-G(OOC-A-COO-G)_x-OH$$

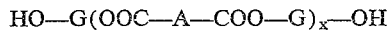

in which G and A are divalent organic radicals corresponding, respectively, to the radicals in the initial glycol and dicarboxylic acid and $x$ is an integer of from 1 to about 20.

5. The process of claim 1 in which the temperature is between about 260° C. and about 400° C.

6. The process of claim 1 in which the glycol partial pressure is below 0.1 mm.

7. The process of claim 1 in which the polymerization is continued until a polyester is formed having the formula $$HO-G(OOC-A-COO-G)_y-OH$$

in which G and A are divalent organic radicals corresponding, respectively, to the radicals in the initial glycol and dicarboxylic acid and $y$ is at least 70.

8. The process of claim 7 in which $y$ is between about 70 and about 1,000.

9. The process of claim 1 in which the film as it is being polymerized is surrounded by an atmosphere of an inert gas.

10. The process of claim 1 in which the film is chilled immediately after polymerization.

11. In the process of polymerizing bifunctional ester-forming reactants in the presence of a catalyst with evolution of a volatile by-product to form a linear condensation polyester, the improvement which comprises forming the said ester-forming reactants into a film having a thickness between about 0.01 and 1 mil while at least a substantial part of said evolution of volatile by-product remains for completion and then polymerizing the reactants by heating the said film to a temperature of at least 260° C. for a period of time between about 2 seconds and 2 minutes until a polyester having an intrinsic viscosity between about 0.6 and about 2.5 is obtained, and during the heating maintaining the partial pressure of the volatile by-product released from the reactants at less than about 2 mm. of mercury.

12. The process of claim 11 in which the ester-forming reactants have an intrinsic viscosity substantially less than 0.6.

13. The process of claim 11 in which a film of the said ester-forming reactants is deposited on a moving tape.

14. The process of claim 11 in which the temperature is between about 260° C. and 400° C.

15. The process of claim 11 in which the film as it is being polymerized is surrounded by an atmosphere of an inert gas.

References Cited in the file of this patent
UNITED STATES PATENTS

| | | |
|---|---|---|
| 2,497,376 | Swallow et al. | Feb. 14, 1950 |
| 2,607,081 | Taylor | Aug. 19, 1952 |
| 2,815,307 | Beck | Dec. 3, 1957 |
| 2,909,809 | Engelhardt | Oct. 27, 1959 |